(12) United States Patent
Muehge et al.

(10) Patent No.: US 11,442,816 B2
(45) Date of Patent: Sep. 13, 2022

(54) PERFORMANCE OF BACKUP OPERATIONS IN AN ORDER DETERMINED USING SERVICE-METADATA ASSOCIATED WITH BACKUP REQUESTS

(71) Applicant: International Business Machines Corporation, Armonk, NY (US)

(72) Inventors: Thorsten Muehge, Mainz (DE); Erik Rueger, Mainz (DE); Mehmet-Zafer Inal, Bad Vilbel (DE); Boris Gulbadamov, Luebeck (DE); Frank Krick, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/208,371

(22) Filed: Dec. 3, 2018

(65) Prior Publication Data
US 2020/0174892 A1 Jun. 4, 2020

(51) Int. Cl.
| | |
|---|---|
| G06F 12/00 | (2006.01) |
| G06F 11/14 | (2006.01) |
| G06F 9/48 | (2006.01) |
| G06F 9/54 | (2006.01) |
| G06F 9/50 | (2006.01) |

(52) U.S. Cl.
CPC ........ *G06F 11/1461* (2013.01); *G06F 9/4881* (2013.01); *G06F 9/5038* (2013.01); *G06F 9/546* (2013.01); *G06F 11/1451* (2013.01); *G06F 11/1464* (2013.01); *G06F 11/1469* (2013.01); *G06F 2201/81* (2013.01); *G06F 2209/501* (2013.01); *G06F 2209/5013* (2013.01); *G06F 2209/5021* (2013.01); *G06F 2209/548* (2013.01)

(58) Field of Classification Search
CPC ....... G06F 9/4881; G06F 9/5038; G06F 9/546
USPC .......................................................... 711/162
See application file for complete search history.

(56) References Cited

U.S. PATENT DOCUMENTS

| | | | |
|---|---|---|---|
| 8,561,076 B1 | 10/2013 | Desai et al. | |
| 8,645,366 B1* | 2/2014 | Acharya | G06F 16/9537 |
| | | | 707/723 |

(Continued)

OTHER PUBLICATIONS

Veeam, "Tape Parallel Processing," Veeam Help Center, May 2018, 4 pages, retrieved from https://helpcenter.veeam.com/docs/backup/vsphere/parallel_processing.html?ver=95.

*Primary Examiner* — Mohamed M Gebril
(74) *Attorney, Agent, or Firm* — Zilka-Kotab, P.C.

(57) ABSTRACT

A computer-implemented method according to one embodiment includes receiving a plurality of backup requests at a data storage system having a data storage library. At least some of the backup requests have unique service-metadata associated therewith. Each backup request is placed in a backup queue, where an ordering of the backup requests within the backup queue is based at least in part on the service-metadata. Backup operations are performed on the data storage system in accordance with the ordering of the backup requests within the backup queue. A computer program product for determining resource allocation in a backup environment according to another embodiment includes a computer readable storage medium having program instructions embodied therewith. The program instructions are readable and/or executable by a computer to cause the computer to perform the foregoing method.

19 Claims, 6 Drawing Sheets

(56) References Cited

U.S. PATENT DOCUMENTS

| | | | |
|---|---|---|---|
| 9,880,906 B2 | 1/2018 | Gold et al. | |
| 2003/0236956 A1* | 12/2003 | Grubbs | G06F 11/1458 711/159 |
| 2004/0122832 A1* | 6/2004 | Heil | G06F 3/1296 |
| 2004/0139294 A1* | 7/2004 | Colvig | G06F 11/1464 711/156 |
| 2006/0277524 A1* | 12/2006 | Goodman | G06F 11/1433 717/106 |
| 2010/0211680 A1* | 8/2010 | Chatterton | G06F 9/5011 718/104 |
| 2012/0102280 A1* | 4/2012 | Nasu | G06F 11/1464 711/E12.103 |
| 2014/0052694 A1* | 2/2014 | Dasari | G06F 11/1461 707/654 |
| 2014/0181395 A1* | 6/2014 | Vincent | G06F 3/0605 711/111 |
| 2015/0254141 A1 | 9/2015 | Wertheimer et al. | |
| 2016/0054931 A1* | 2/2016 | Romanovsky | G06F 3/0643 711/103 |
| 2016/0092109 A1* | 3/2016 | Wu | G06F 3/061 711/114 |
| 2016/0094396 A1* | 3/2016 | Chandrashekhar | H04L 41/0806 370/254 |
| 2018/0096068 A1* | 4/2018 | Venkataramanappa | G06F 16/1844 |
| 2018/0137064 A1* | 5/2018 | Akmal | G11B 20/00876 |
| 2018/0137139 A1* | 5/2018 | Bangalore | G06F 16/2379 |
| 2018/0165161 A1* | 6/2018 | Slater | G06F 3/0641 |
| 2018/0335968 A1* | 11/2018 | Pauley | G06F 3/068 |
| 2020/0125262 A1* | 4/2020 | Hebsur | G06F 11/1458 |

* cited by examiner

| Number of drives | Number of backups/24 hours | Average backup time/drive/1 hour | Utilization/drive | Queue length | Wait time/hour |
|---|---|---|---|---|---|
| 1 | 20 | 5 | >100% | | |
| 2 | 20 | 5 | >100% | | |
| 3 | 20 | 5 | >100% | | |
| 4 | 20 | 5 | >100% | | |
| 5 | 20 | 5 | 83% | 3.1 | 3.72 hours |
| 6 | 20 | 5 | 64% | <1 | 54 minutes |
| 7 | 20 | 5 | 60% | <1 | 17 minutes |
| 8 | 20 | 5 | 52% | <1 | 5 minutes |

FIG. 6

PERFORMANCE OF BACKUP OPERATIONS IN AN ORDER DETERMINED USING SERVICE-METADATA ASSOCIATED WITH BACKUP REQUESTS

BACKGROUND

The present invention relates to resource allocation in a backup environment, and more specifically, this invention relates to resource allocation for backup operations performed on a data storage system.

Data storage systems are commonly utilized by clients for storing and thereafter accessing data. Data storage systems typically utilize at least one type of memory, e.g., magnetic recording tape, hard disc, flash memory, etc., for storing the client data. Such client data is stored to memory of the data storage system in response to the data storage system receiving backup requests, which may include, e.g., requests to update data that is already stored in the memory, requests to store new data in the memory, requests to temporarily store data in the memory, etc.

SUMMARY

A computer-implemented method according to one embodiment includes receiving a plurality of backup requests at a data storage system having a data storage library. At least some of the backup requests have unique service-metadata associated therewith. Each backup request is placed in a backup queue, where an ordering of the backup requests within the backup queue is based at least in part on the service-metadata. Backup operations are performed on the data storage system in accordance with the ordering of the backup requests within the backup queue.

A computer program product for determining resource allocation in a backup environment according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor, the logic being configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 6 is a table containing service-metadata information that is associated with backup requests, in accordance with one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for resource allocation for backup operations performed on a data storage system.

In one general embodiment, a computer-implemented method includes receiving a plurality of backup requests at a data storage system having a data storage library. At least some of the backup requests have unique service-metadata associated therewith. Each backup request is placed in a backup queue, where an ordering of the backup requests within the backup queue is based at least in part on the service-metadata. Backup operations are performed on the data storage system in accordance with the ordering of the backup requests within the backup queue.

In another general embodiment, a computer program product for determining resource allocation in a backup environment includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor, the logic being configured to perform the foregoing method.

Figure 1:
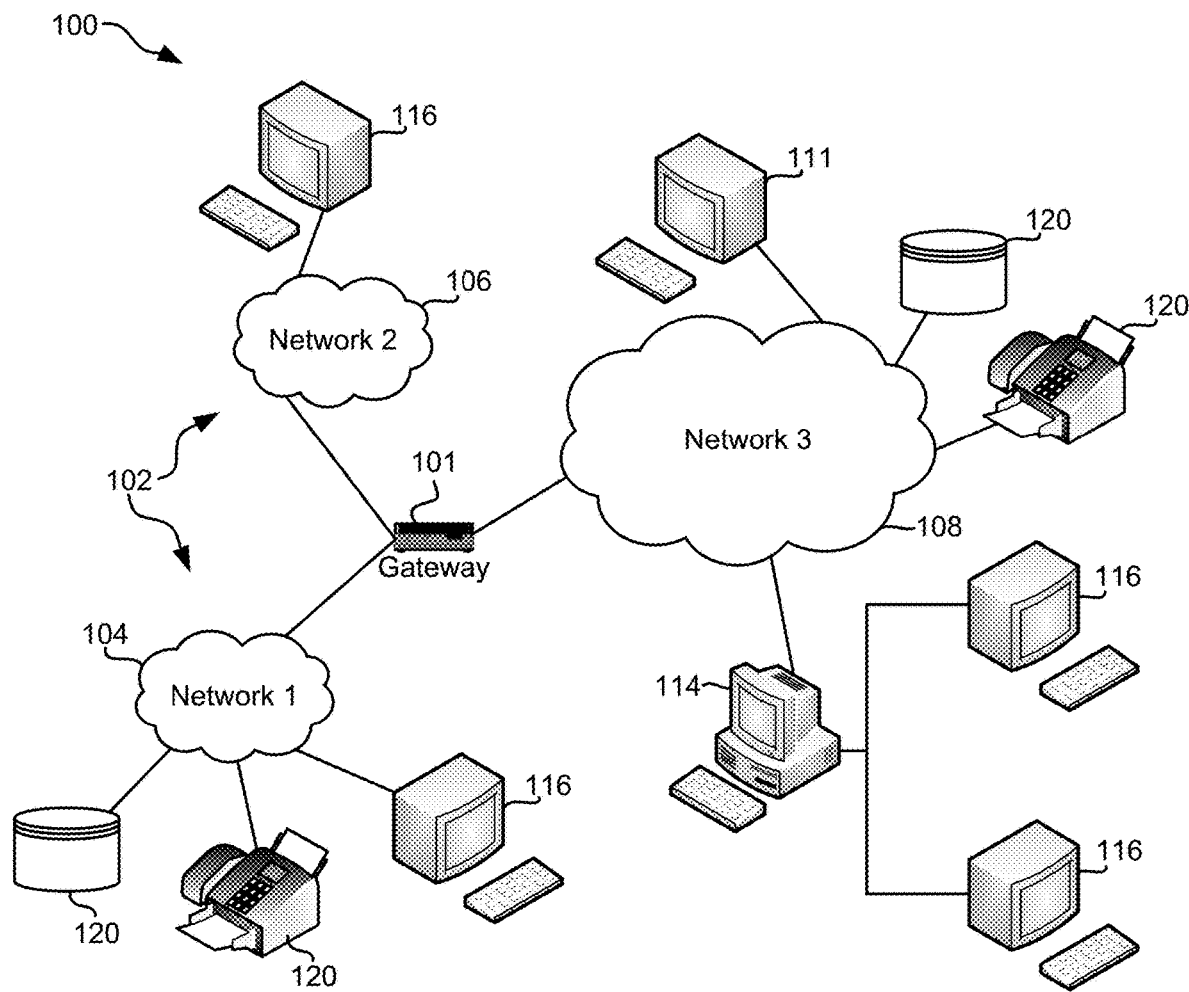
FIG. 1 is a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
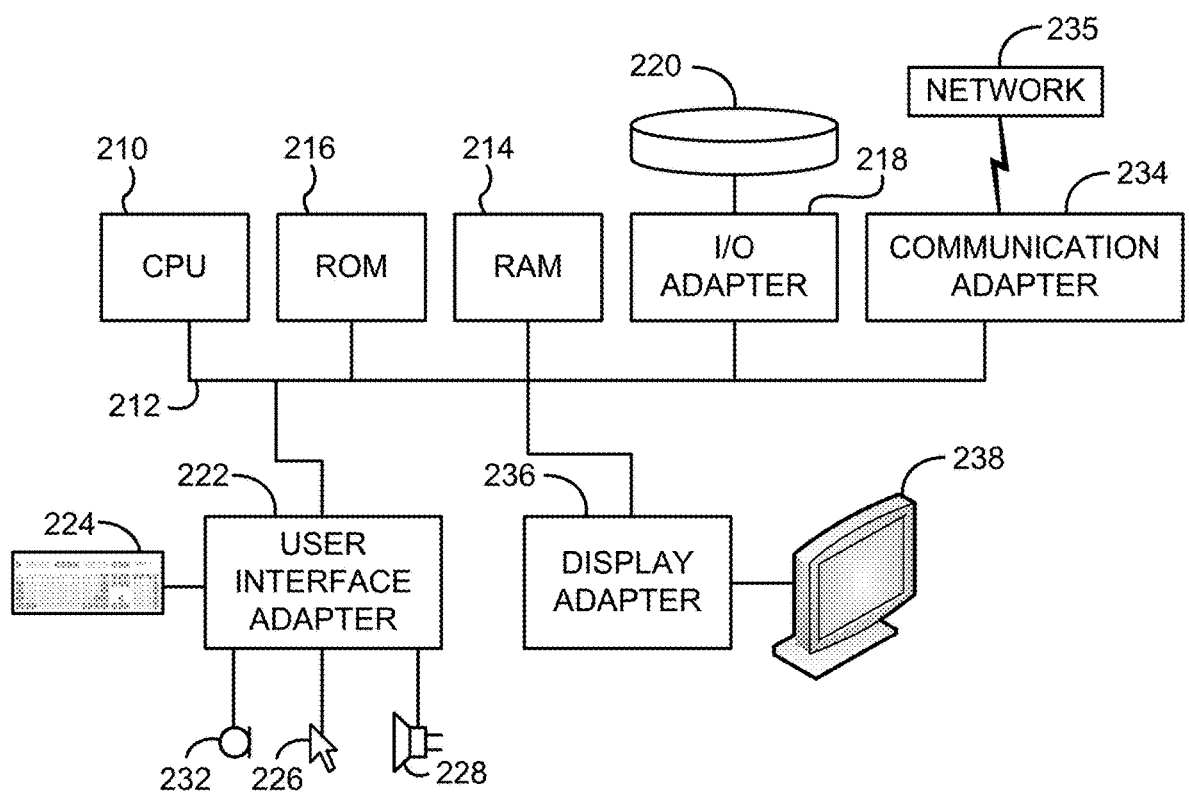
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
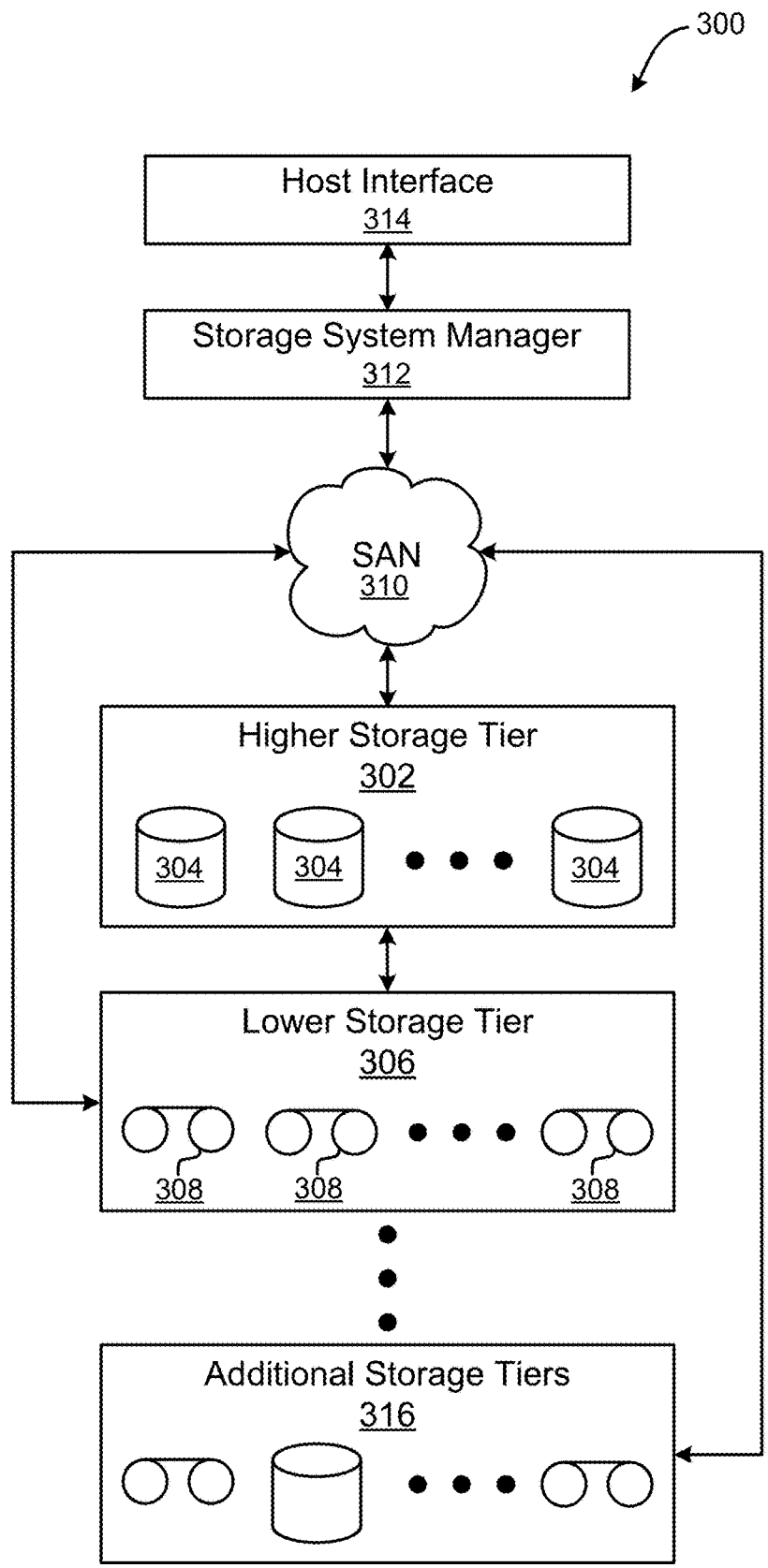
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned elsewhere above, data storage systems are commonly utilized by clients for storing and thereafter accessing data. Data storage systems typically utilize at least one type of memory, e.g., magnetic recording tape, hard disk, flash memory, etc., for storing the client data. Such client data is stored to memory of the data storage system in response to the data storage system receiving backup requests, which may include requests to create a backup copy of the data, requests to update data that is already stored in the memory (e.g., incremental backup), requests to store new data in the memory, requests to temporarily store data in the memory, etc.

Because such conventional data storage systems include a finite amount of resources, e.g., processing bandwidth, concurrent backup operation capabilities, data writers, etc., backup requests sometimes cannot be fulfilled at the time that they are received. Instead, fulfilment of the backup requests is postponed until backup resources become available. In some approaches, backup requests that are waiting to be fulfilled are placed in a queue. The requests within such a queue are sometimes fulfilled in the order of "first-in first out" (FIFO) or "last-in first-out" (LIFO). However, these techniques for emptying a queue as data storage system resources become available do not consider whether a client (that sent such backup requests) has a preferred order of fulfilling the backup requests. For example, a client may consider some backup requests urgent, while it may be acceptable to the client if some other backup requests are fulfilled at a later time. This sometimes undesirably results in client frustration and even data losses, as some clients cannot afford urgent backup requests to be fulfilled only once resources become available.

Moreover, in conventional data storage systems that are associated with distributed backup environments, resources are sometimes shared by all clients and agents. As a result, some of the clients do not always have access to requested resources, e.g., the clients in such cases only have access to resources (if any) that are available at the time of the request. Moreover, such resources can only be assigned manually in conventional systems, which consumes high administrative efforts and expenditures of time. Some conventional applications and tools have undertaken steps to reduce the complexity of such systems, e.g., by centralizing tape library and media management; however, these efforts have proven unsuccessful in mitigating the aforementioned deficiencies. This is because such applications do not have information about current/actual job status of servers of the conventional data storage system, because there is no permanent communication between associated applications and the servers. Moreover, in data storage systems that use magnetic recording tape, communication between a backup server and tools is limited to mounting and unmounting tapes, and does not focus on jobs on the backup server that request these mount and unmount operations. Yet furthermore, all definitions of environments containing such conventional data storage systems are made one time, e.g., pre-set, and cannot be adjusted automatically to reflect current conditions of the environments.

It should be noted that assigning particular drives to specific clients in conventional tape based data storage systems does not remedy the above described deficiencies. This is because it is often difficult to exclusively use a certain number of drives for a specific client in a shared backup and recovery (B&R) environment, as all library clients share the available drives between each other.

In addition to sharing drives, backup requests of conventional data storage systems sometimes struggle to complete backup operations within a limited backup/restore window. When the backup operations are not accomplished with in the limited window, applications that requested such backups are not able to run in a productive mode afterwards (after the backup has been completed).

Moreover, data storage system administrators are typically restricted to accessing servers manually in order to free up resources for backup/restore requests (during the whole operational period). Regardless, administrator intervention is not desirable, and adds even more to the cost of running the conventional data storage systems.

Various embodiments and/or approaches herein include performing backup operations in accordance with an ordering of the backup requests within a backup queue of a data storage system. In sharp contrast to conventional techniques described elsewhere herein, the backup queue of various embodiments and/or approaches herein is based at least in part on unique service-metadata associated with the backup requests. Accordingly, in some approaches, an order in which the backup requests are fulfilled dynamically considers the unique preferences of backup client(s) sending the backup requests in view of the resources available in the data storage system.

Figure 4:
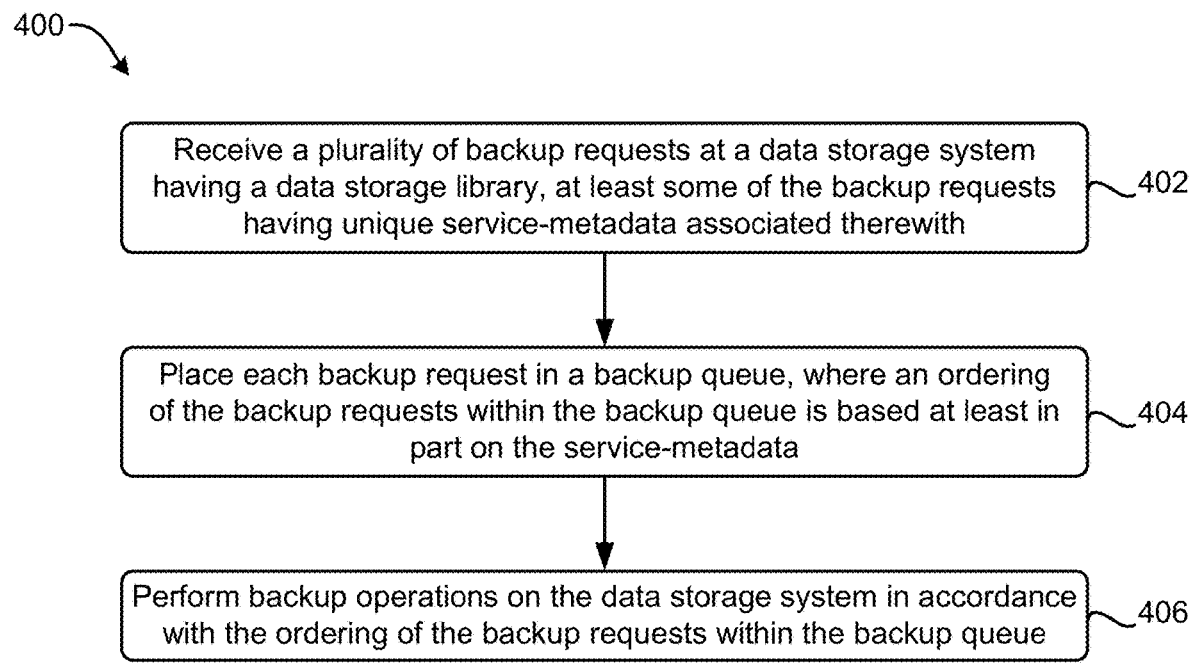
FIG. 4 is a flowchart of a method, in accordance with one embodiment.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Operation 402 of method 400 includes receiving a plurality of backup requests at a data storage system having a data storage library. The data storage system may include any data storage library configuration. For example, as will be described elsewhere herein, the data storage library configuration may include a plurality of logical libraries across one or more physical library frames, e.g., see FIG. 5.

In preferred approaches, at least some of the backup requests have unique service-metadata associated therewith. The service-metadata may include any type and/or quantity of information. Moreover, the service-metadata may be predefined by any source, as will be further described in various approaches below.

For example, in some approaches, at least a portion of the service-metadata associated with at least one of the backup requests is defined by a backup client sending the backup requests. In some of such approaches, the service-metadata of the backup requests is defined by a user of the backup client sending the backup requests. For example, in one approach, the service-metadata is defined in client related configuration files that are received with the backup requests. Prior to being sent by the client to the data storage system, the client related configuration files may be modified/edited by individual client users, in accordance with the individual user's access rights.

In one approach, a client graphical user interface (GUI) may be used to modify/edit a subset (at least some of the parameters) of the service-metadata, e.g., as a more user-friendly manner of modifying/editing.

These configuration files may be stored until a backup is to be performed for the client, such as in response to an updating of data. Upon starting a client application, e.g., used to send a backup request and associated service-metadata to the data storage system, software of the client application may read the configuration files, and act based on the definition(s) therein.

Based on the configuration, in some approaches filtering is performed by the client. The resulting backup requests and service-metadata are output and thereafter received at the data storage system, e.g., see operation 402.

In some other approaches, at least a portion of the service-metadata associated with at least one of the backup requests is defined by a server. In some of such approaches, the service-metadata of the backup requests is defined within each backup-server, e.g., see FIG. 5, of a data storage environment by a server administrator.

In one approach, a set or a subset of service-metadata is defined for each connected client, e.g., on a global scale. The definitions may be limited to only some of the parameters of the service-metadata in some approaches. In such approaches, the remaining parameters may be defined by and/or for each client individually.

Configuration data of the administrator defined service-metadata may be stored on a server based configuration data base. Upon a backup client connecting to a server associated with the server based configuration data base, the client and the configuration corresponding to the client are synchronized. Remaining client site configurations may follow as defined in the above approach in which the service-metadata associated with at least one of the backup requests is defined by a backup client sending the backup requests.

In some approaches, subsequent filtering of the configurations performed by the clients, the resulting backup requests and service-metadata are output, and thereafter received at the data storage system, e.g., see operation 402.

With continued reference to method 400, operation 404 includes placing each backup request in a backup queue.

The backup queue serves as a list from which backup requests are prioritized in an order that maintains and/or increases performance of the data storage system. Moreover, such an ordering is especially beneficial in approaches where the data storage system does not include resources for fulfilling all of the received backup requests upon receiving them. For example, as will be described elsewhere herein, in response to establishing such an order in which the backup requests are fulfilled, urgent backup requests are preferably not demoted to a lower priority in the backup queue than relatively less urgent backup requests.

In preferred approaches, an ordering of the backup requests within the backup queue is based at least in part on the service-metadata. For example, in one approach, the ordering of the queue is determined by a queuing engine that considers the service-metadata. Various non-limiting types of service-metadata will now be described below.

According to one approach, the service-metadata includes service level data, which is preferably defined by a backup client sending the backup requests. In one approach, service level data may specify and/or may be used to determine an urgency/priority of fulfilling the associated backup job relative to the other backup jobs. For example, some service level data may indicate that a first backup job is considered urgent (and therefore should be fulfilled promptly if possible) for a client that sent the backup requests, while other service level data may indicate a different backup request is not urgent, and therefore may be fulfilled at a later time if processing resources are currently limited. In response to determining that utilization of resources of the data storage system is currently approaching 100%, backup request that are not urgent may be fulfilled at a later time when such resources are more prevalently available.

In another approach, the service-metadata additionally and/or alternatively includes measured actual wait time information, e.g., such as measured actual wait time in minutes, hours and/or days. Measured actual wait time information may specify how long an associated backup request has been waiting to be fulfilled, e.g., as determined by a server of the data storage system. For example, in one approach, the measured actual wait time information may indicate how long the backup request has been in the backup queue waiting to be fulfilled. Those backup requests having a longer actual wait time may be given priority over those backup requests having a relatively shorter actual wait time. In another approach, the actual wait time information may be determined by the queuing engine based on results/information of one or more previously fulfilled backup requests, thereby providing an estimate of when a backup request will actually be initiated and/or completed (fulfilled).

Moreover, the service-metadata may additionally and/or alternatively include maximum (max) wait time information, e.g., such as max wait time in minutes, hours and/or days. The max wait time may specify the maximum amount of time that the backup request may remain unstarted and/or unfulfilled. For example, in one approach, the max wait time information specifies a maximum amount of time that an associated backup request can wait to be fulfilled, after which not fulfilling the backup request is expected to cause undesirable problems in the data storage system such as production issues with servers associated with the data storage system, data losses due to overwriting without backup being performed prior to the overwriting, exceeding predetermined customer wait time thresholds, etc.

Max wait time information is preferably defined by a backup client sending the backup requests. In contrast, in another approach, the max wait time information may be specified by the data storage system, or from some other source.

In another approach, the service-metadata additionally and/or alternatively includes measured run time information. The measured run time information may be measured from any one or more sources, e.g., from a feedback loop, during a previous performance of backup operations for a similar backup request, from a table, etc. The measured run time information may specify any one or more of, e.g.,: an amount of time that performing a backup operation for the backup request associated with the service-metadata is expected to take, the processing resources that are expected to be consumed in performing a backup operation for the backup request associated with the service-metadata, an amount of time that current backup operations have been performed for at least some of the backup requests in the backup queue, etc.

In yet another approach, the service-metadata additionally and/or alternatively includes total backup volume information, e.g., in some quantity such as terabytes (TB). This information is particularly useful where a single backup request is requesting a very large backup that will take a long time and a large amount of storage space to fulfill, and/or where several smaller backup requests are combined into a single combined backup operation, e.g., into a single volume on tape. In the former case, where a very large backup is requested, an estimate can be made as to how long it will take to perform the backup and/or whether the backup system has sufficient resources (e.g., available storage) to complete the backup request. In the latter case, the time to perform all operations for the total backup volume may vary in accordance with how long backup operations associated with the backup request(s) are expected to take. For example, in one approach, although performing the actual writing operation for a first backup request may only take several seconds to perform, in a magnetic tape-based data storage system, fulfilling the first backup request may also include, e.g., loading a tape, threading the tape, mounting the tape, spooling to the writing location, etc. prior to beginning writing. In some approaches, these additional operations may substantially increase the time to perform the total backup volume of the first backup request. In another example, where a read operation of a backup request includes aggregated read operations, these additional threading operations, mounting operations, loading operations, etc. may also contribute to an even greater total backup volume. Accordingly, in response to considering such factors in the placing of backup request in the backup queue, an efficient ordering of the backup queue is yet further refined.

The total backup volume information may be measured and/or estimated from any one or more sources, e.g., from a feedback loop, during a previous performance of backup operations for a similar backup request, from a table, etc. Moreover, the total backup volume information may additionally and/or alternatively be determined by a server of the data storage system.

In some approaches, a backup request that is associated with a relatively large total backup volume may have a different priority in the queue than a backup request that is associated with a relatively small total backup volume. For example, in one approach, a backup request that is associated with a relatively large total backup volume may be given a higher priority within the queue in response to determining that backup operations for backing up the relatively large total backup volume will consume more time than backup operations for backing up the relatively small total backup volume. In other words, as a result of awarding backup requests having relatively large total backup volumes a relatively higher priority within the queue, the relatively more time consuming backup operations may be initiated sooner. To clarify, the term "sooner" is described with respect to a potential postponing of the backup operations that would otherwise occur as a result of being awarded a relatively lower priority within the queue.

In some approaches, placing each backup request in the backup queue includes determining a group to which the backup request belongs, a group ranking of the group, and a sub-ranking for each of the backup requests within each group.

In one approach, each group ranking is determined from service level data of the service-metadata. For example, each of the backup requests having a predefined service level 1 designation are grouped in a first group, each of the backup requests having a predefined service level 2 designation are grouped in a second group, each of the backup requests having a predefined service level 3 designation are grouped in a third group, etc. The service level data of the service-metadata may be predefined, e.g., by a backup client sending the backup requests.

In some approaches, the service level data may group related backup requests together, e.g., backup requests that have similar total backup volumes, backup requests that are associated with similar types of data, backup requests that are associated with similar components of the data storage system, etc.

Priority rankings of the groups may be determined, e.g., based on predefined criteria (e.g., group 1 has the highest priority), based on the requests within each group, etc. For example, with reference again to the example above describing service level 1-3 designations, the group having backup requests with service level 1 designations may be determined to have a highest priority group ranking (priority of fulfilling the backup requests). Moreover, the group having backup requests with service level 2 designations may be determined to have a second highest priority group ranking. Furthermore, the group having backup requests with service level 3 designations may be determined to have a third highest priority group ranking.

In preferred approaches, a relative sub-priority of the backup requests within each group is also determined, where each sub-ranking is determined based on a sub-ranking priority value calculated using the service-metadata. In one approach, where the data of the backup requests is stored and/or to be stored on a magnetic recording tape of the data storage system, the sub-ranking priority value is determined using the following equation:

$$\text{sub-ranking priority value} = A1(1-(\text{actual wait time}/\text{max wait time})) + A2((1-\text{mount time})/\text{backup run time})), \quad \text{Equation (1)}$$

where "A1" and "A2" are any predefined constant values, "mount time" is the time required to mount a magnetic recording tape of the data storage system on which backup operations for a backup request are performed, and "backup run time" is the time that performing such backup operations is expected to take. In some approaches where the data storage system utilizes magnetic recording tape-based storage, the mount time per backup request may be evaluated by the queuing engine from known backup sequences on library magnetic recording tapes. Based on Equation (1) above, backup requests having relatively shorter mount times and having relatively shorter backup run times will in turn have relatively greater sub-ranking priority values, and accordingly be placed in a relatively higher priority in the backup queue relative to other requests within the same group.

Operation 406 of method 400 includes performing backup operations on the data storage system in accordance with the ordering of the backup requests within the backup queue. In some approaches, operation 406 includes concurrently performing backup operations on the data storage system for more than one of the backup requests, e.g., processing resources are divided in order to concurrently fulfill a plurality of the backup requests in parallel. In contrast, in other approaches, operation 406 includes performing backup operations on the data storage system for only a single of the backup requests at a time, e.g., processing resources are devoted to fulfilling only a single one of the backup requests at a time.

It should be noted that the ordering of the backup requests within the backup queue may be changed at any time. For example, according to some approaches, at any time during performance of method 400 additional read requests may be received. Subsequently method 400 may include performing a reordering/re-queuing of the backup queue, e.g., by the queueing engine. In another approach, method 400 may include performing a reordering/re-queuing of the backup queue in response to detecting a change in service-metadata associated with one or more backup requests. Accordingly, a data storage system performing method 400 effectually establishes a dynamic backup environment.

As will now be described below, in some approaches, in order to perform backup operations on the data storage system in accordance with the ordering of the backup requests within the backup queue, method 400 may optionally include terminating currently running operations to free up processing resources for one or more of the backup requests.

In some approaches, the terminated currently running operations may include a running backup request that has a lower priority than a backup request in the queue. For example, in one approach, in response to determining that a sub-ranking priority value of a first backup request is greater than a predetermined threshold priority value, e.g., where such a threshold is predetermined by the queuing engine, method 400 optionally includes terminating a running backup request having a lower sub-ranking priority value than the sub-ranking priority value of the first backup request. In some approaches, the terminated running backup request includes a particular type of backup request. For example, in one approach, the terminated running backup request must include a maintenance job.

Note that the predetermined threshold priority value may include any value. In some approaches, the predetermined threshold priority value is set to be the sub-ranking priority value of a particular backup request within the queue, e.g., the third backup request in the backup queue, the second backup request in the backup queue, the tenth backup request in the backup queue, etc.

According to various approaches, the terminated currently running operation may include any type of operation. In some approaches, the terminating currently running operation includes a specific type of operation. For example, in one approach, the terminated running backup request is associated with housekeeping, e.g. collocation jobs operations within the data storage library.

Note that in preferred approaches, termination of a running backup request that has a lower priority than a backup request in the queue is only performed in response to determining that a currently unused drive from another logical library cannot (for any reason) be dynamically added to/borrowed by the logical library in which backup operations for the backup requests are being performed.

In some approaches, when determining whether to terminate a running backup request (that has a lower priority than a backup request in the queue), the current fulfillment progress of the backup request may be considered. For example, in various approaches, currently running operations that are determined to be close to being completed, e.g., 80% or greater, 90% or greater, 98% or greater, may not be terminated. In one approach, a running backup request having a lower degree of completion may be instead terminated.

Note that in some approaches, a running backup request that was terminated prior to being fulfilled may be placed in the backup queue, e.g., within a determined group and within a sub-ranking of the determined group, for fulfillment at a later time. In another approach, the terminated backup request may not be placed back in the backup queue. In such an approach, method 400 may optionally include outputting a notice of the termination and non-fulfillment of the backup request, e.g. to a client that previously sent the backup request.

In response to determining that a sub-ranking priority value of a first backup request is greater than a predetermined threshold priority value, in one approach, method 400 additionally and/or alternatively includes canceling a housekeeping operation within the data storage library for freeing a drive, and assigning the first backup request to the freed drive. The housekeeping operation may include any known type of operation, e.g., a collocation job, garbage collection, etc. In some approaches cancelling housekeeping operations instead of other backup requests having a lower sub-ranking priority may be preferred where a backup client has sent and is currently waiting for the backup requests to be fulfilled, and is less concerned with the housekeeping operations being fulfilled. Cancelled housekeeping operations may be forgotten, or be scheduled for performance at a later time, e.g., upon the backup queue being reduced or emptied.

In a more specific approach, in response to determining that a sub-ranking priority value of a first backup request is greater than a predetermined threshold priority value, method 400 additionally and/or alternatively includes canceling at least one backup request in a priority with the following cancel conditions:

1.) Housekeeping related backup requests e.g. collocation jobs are cancelled first (in case sufficient resources, e.g., tape cartridge resources, are available)
2.) Remaining backup time of the backup request<predetermined threshold value (e.g. 80% of the backup operations for a backup request are already completed)
3.) Cancel, e.g., backup jobs with the largest finish time first
4.) The cancellation procedure can be defined with higher granularity if instructed by the users of a backup client sending the backup requests Note that restore based backup requests are in general preferably not cancelled.

In some approaches, method 400 may additionally and/or alternatively include recruiting additional resources for performing backup operations on the data storage system in response to determining that a sub-ranking priority value of a first backup request is greater than a predetermined threshold priority value. For example, in one approach, the data storage library may be divided, e.g., by an advanced library manager service (ALMS) into at least two logical libraries, e.g., see FIG. 5, where the backup requests are serviced by one of the logical libraries. In such an approach, in response to determining that a sub-ranking priority value of a first backup request is greater than a predetermined threshold priority value, method 400 may include recruiting an unused drive from another of the logical libraries to at least temporarily assist in performing a backup operation corresponding to the first backup request. The recruiting an unused drive, in one approach, includes the ALMS instructing a reorganization of the resources of the logical libraries.

In some approaches, the recruiting of additional resources for performing backup operations on the data storage system is performed in response to determining that resources that are currently performing backup operations cannot be used for fulfilling a first backup request that has a sub-ranking priority value that is greater than a predetermined threshold priority value. For example, assume that the data storage system is a magnetic recording tape based data storage system, e.g., see FIG. 5. In one approach, in response to determining that magnetic recording tape resources of a first logical library cannot currently be freed-up for fulfilling the first backup request, unused magnetic recording tape drives from a second logical library may be dynamically added, e.g., by an ALMS agent, into the first logical library. In other words, unused resources in the data storage system are at least temporarily borrowed for performing the first backup request. Such a recruiting of resources in the present approach is important, because the first backup request is likely an urgent backup request, as indicated by the first backup request having a sub-ranking priority value that is greater than the predetermined threshold priority value.

Of course, any recruited unused drives may be reverted to being used for other operations (non-backup operations) again at any time and/or for any reason. Accordingly, method 400 in effect establishes a dynamic process within the data storage system for fulfilling received backup requests while preventing exhaustion of processing resources used in performing backup operations on the data storage system.

In another approach, in addition to and/or as an alternative to recruiting additional resources for performing backup operations on the data storage system, method 400 may optionally include freezing and/or decreasing the number of backup requests. For example, in response to determining that the number of backup requests received is more than the data storage system can process at one time, method 400 may optionally include setting a threshold to the number of backup requests that may be received within a predefined amount of time, e.g., predefined by the queuing engine. Notifications that backup requests have been suspended, canceled or refused entry into the backup queue may be sent to the client.

Operations of method 400 establish a dynamic backup queue in which an ordering of backup requests, when fulfilled, maintains and/or increases performance of the data storage system. Moreover, such an increase in performance (as compared to conventional backup systems) is available as a result of various of the embodiments and/or approaches described herein being able to recruit logical library resources to another logical library. It should be noted that this automatic dynamicity is not otherwise available in conventional systems in which the importance/urgency of backup requests are not considered. This is largely in part due to the fact that resources of conventional distributed backup environments are sometimes shared by all clients and agents. As a result, some of the clients utilizing such conventional environments do not always have access to requested resources, e.g., the clients in such cases only have access to the resources (if any) that are available at the time of the request.

Moreover, it should be noted that the order of the backup queue and/or operations of borrowing resources (where doing so would increase processing efficiencies/resource utilization) described in various embodiments and/or approaches herein are automatically performed as a result of implementation of method 400. This additional noteworthy benefit is also not otherwise available in conventional backup systems which typically resort to relying on manual assistance of an administrator (which as previously noted undesirably consumes high administrative efforts and expenditures of time).

Figure 5:
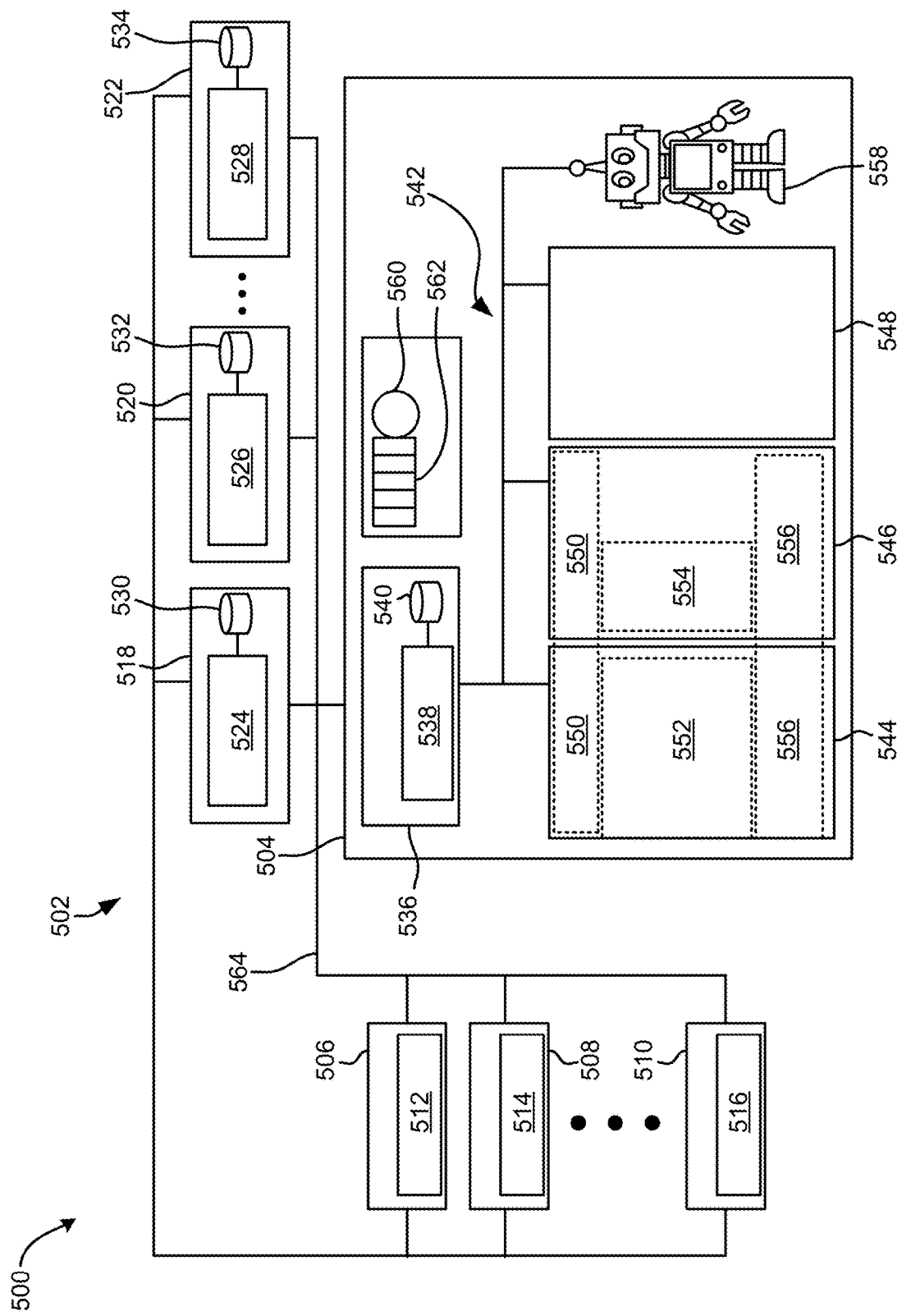
FIG. 5 is a network environment, in accordance with one embodiment.

FIG. 5 depicts a network environment 500, in accordance with one embodiment. As an option, the present network environment 500 may be implemented in conjunction with features from any other embodiment listed herein, such as those described with reference to the other FIGS. Of course, however, such network environment 500 and others presented herein may be used in various applications and/or in permutations which may or may not be specifically described in the illustrative embodiments listed herein. Further, the network environment 500 presented herein may be used in any desired environment.

The network environment 500 includes a data storage system 502 having a magnetic recording tape data storage library 504. Moreover, the network environment 500 includes a storage area network (SAN) 564 along which backup data is transferred, a plurality of backup clients 506, 508, 510, and a plurality of backup servers 518, 520, 522 each having a database 530, 532, 534 (respectively).

The magnetic recording tape data storage library 504 includes a tape library controller 536 having an advanced library manager server 538 and database 540 therein. Moreover, the magnetic recording tape data storage library 504 includes a library control network 542 having a plurality of magnetic recording tape frames 544, 546, 548. The data storage library 504 may be divided, e.g., by an ALMS, into at least two logical libraries. For example, at least some of the magnetic recording tape frames 544, 546, 548 include unique and/or shared associated logical libraries, e.g., see logical library 550 (shared between frames 544 and 546), logical library 552 (unique to frame 544), logical library 554 (unique to frame 546), and logical library 556 (shared between frames 544 and 546). Moreover, each of the magnetic recording tape frames 544, 546, 548 may include magnetic recording tape drives (not shown for simplified viewing purposes), where each of the logical libraries 550, 552, 554, 556 are assigned at least one of such drives.

In some approaches, agents of the ALMS serve as interfaces between various portions of the network environment 500. For example, ALMS agents 512, 514, 516 and ALMS agents 524, 526, 528 serve as an interface between, e.g., the logical libraries 550, 552, 554, 556; the backup servers 518, 520, 522; the backup clients 506, 508, 510; etc.

In one approach, the library control network 542 includes a tape library medium changer 558, which may be a known type of robotic accessor.

The backup clients 506, 508, 510 may send a plurality of backup requests to the magnetic recording tape data storage library 504. The plurality of backup requests is received at the magnetic recording tape data storage library 504 for fulfillment. In preferred approaches, at least some of the backup requests have unique service-metadata associated therewith.

Each backup request is placed, e.g., by a queuing engine 560, in a backup queue 562. In some approaches, an ordering of the backup requests within the backup queue 562 is based at least in part on the service-metadata. Moreover, in some approaches, placing each backup request in the backup queue 562 includes determining a group to which the backup request belongs, a group ranking of the group, and a sub-ranking for each of the backup requests within each group. In such approaches, each group ranking may be determined from service level data of the service-metadata, where each sub-ranking is determined based on a sub-ranking priority value calculated using the service-metadata.

In some approaches, one or more of the agents 512, 514, 516, 524, 526, 528 of the ALMS may be used for managing the physical allocation and deallocation of the queuing engine 560. For example, one or more of the agents 512, 514, 516, 524, 526, 528 of the ALMS may be used for scheduling performance of backup operations, terminating a running backup request, terminating a housekeeping operation, etc., based on the ordering of the backup requests within the backup queue 562. Accordingly, in one approach, one or more of such agents 512, 514, 516, 524, 526, 528 communicate with the queuing engine 560 and/or the backup clients 506, 508, 510 sending the backup requests. One or more of the agents 512, 514, 516, 524, 526, 528 may additionally and/or alternatively be used for reconfiguring resources between the different logical libraries 550, 552, 554, 556.

The backup operations are performed on the data storage system 502 in accordance with the ordering of the backup requests within the backup queue 562. In one approach, during performance of the backup operations on the data storage system 502, the queuing engine 560 may be in continuous communication with the backup servers 518, 520, 522, e.g., for monitoring the performance of the backup operations to ensure that the backup operations are performed in accordance with the ordering of the backup requests within the backup queue 562.

FIG. 6 depicts a table 600, in accordance with one embodiment. As an option, the present table 600 may be implemented in conjunction with features from any other embodiment listed herein, such as those described with reference to the other FIGS. Of course, however, such table 600 and others presented herein may be used in various applications and/or in permutations which may or may not be specifically described in the illustrative embodiments listed herein. Further, the table 600 presented herein may be used in any desired environment.

It should be prefaced that the information and values of table 600 of the current simulated approach are provided for purposes of a non-limiting example only.

The table 600 includes tabulated service-metadata information that is associated with backup requests received at a data storage system. Such service-metadata information may be utilized in queuing of backup requests in a backup queue, as described elsewhere herein. In the present approach, the service-metadata information of the table 600 corresponds to one backup queue, and a plurality of job services (eight drives).

It may be assumed that the data storage system of the present approach includes a single waiting queue and a plurality of job services, e.g. drives. Using a known MM/c queue modeling it is possible to simulate this system. From the simulation it is possible to establish the various system parameters. For example, based on the simulation, a forecast of the drive hardware requirements may be established. In one approach, it can be determined from the table 600 that at least five drives should be utilized for performing backup operations on the data storage system in accordance with the ordering of the backup requests within the backup queue in order to prevent an over-utilization, e.g., greater than 100%, of the data storage system resources.

Moreover, in another approach an easy optimization of the data storage system may be established. For example, based on knowing the utilization per drive from the table 600, an optimal number of the drives may be utilized depending on the amount of resources (drives) that are available, e.g., having a utilization that is not greater than 100%. If utilization of a drive is predicted to ever exceed 100%, e.g., a max utilization per drive, additional drives may be recruited in a different logical library of the data storage system for mitigating overuse of a particular drive. Moreover, minimum drive idle times and maximum service rates may be established. For example, such times and rates may be established by taking the actual values measured by the data storage system. This provides the opportunity to estimate the overall utilization of the data storage system. Moreover, this provides an opportunity to estimate a workload of the data storage system, which may be used to identify where the overall data storage system is over-utilized.

Moreover, in one approach, a predictive alerting system may be established using information of the table 600, in which a determination may be made as to when to borrow resources from a different logical library for performing backup operations currently within the backup queue, e.g., see "model output" below in which a preferred utilization may be monitored and maintained by the predictive alerting. In other words, in response to determining that there is not a sufficient amount of available drives to fulfill backup requests within the backup queue in the manner specified by the service-metadata of the backup requests, an alert may be generated and such resources may be attained from a different logical library (if possible). With more resources, more backup operations may be performed on the data storage system, e.g., note that as the number of drives of table 600 increases, the wait time decreases.

Now using specific values of table 600, in the present approach, the table 600 may be used to determine at least the following service-metadata information about the associated data storage system (assuming that the backup rate is 160 MB/second in the present approach):

Lambda=20 Backups/24 hours

Average Backup time=5 hours

Average backup size=2.9 terabytes (which reflects the backup rate being performed for the 5 hours)

Model Output: Minimum of 4 drives required to reach utilization per drive below 100% (note that a drive utilization of 100% or more corresponds to over-utilization of the data storage system resources)

The above determined information may be stored in any memory (local memory of the data storage system and/or other memory known by the data storage system) and considered at any subsequent time, e.g., for analyzing an overall processing performance of the data storage system based on a previous ordering of the backup queue.

Several of the embodiments and/or approaches described herein ensure that backup operations for backup requests determined to be important/urgent will be initiated and fulfilled as quickly as available and/or borrowed resources of the data storage system allow. As a result, a dynamic backup queue is established in which an ordering of backup requests, when fulfilled, maintains and/or increases performance of the data storage system. It should be noted that this is in sharp contrast to backup of conventional storage systems, in which the importance/urgency of backup requests are not considered.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving a plurality of backup requests at a data storage system having a data storage library, at least some of the backup requests having unique service-metadata associated therewith,
wherein the data storage library is divided into at least two logical libraries, the backup requests being serviced by one of the logical libraries;
placing each backup request in a backup queue, wherein an ordering of the backup requests within the backup queue is based at least in part on the unique service-metadata associated with the at least some of the backup requests,
wherein placing each backup request in the backup queue includes determining a group to which the backup request belongs, a group ranking of the group, and a sub-ranking for each of the backup requests within each group,
wherein each group ranking is determined from service level data of the unique service-metadata associated with the at least some backup requests,
wherein each sub-ranking is determined based on a sub-ranking priority value calculated using the unique service-metadata associated with the at least some backup requests;
performing backup operations on the data storage system according to the ordering of the backup requests within the backup queue; and
in response to a determination that a sub-ranking priority value of a first backup request is greater than a predetermined threshold priority value, recruiting an unused drive from another of the logical libraries to assist in performing a backup operation corresponding to the first backup request.

2. The computer-implemented method of claim 1, wherein the unique service-metadata associated with the at least some backup requests includes information that is selected from the group consisting of: measured actual wait time, max wait time, measured run time, and total backup volume.

3. The computer-implemented method of claim 1, wherein the sub-ranking priority value is determined using the following equation:

$$\text{sub-ranking priority value} = A1(1-(\text{actual wait time}/\text{max wait time})) + A2((1-\text{mount time})/\text{backup run time})), \quad \text{Equation (1)}$$

where "A1" and "A2" are any predefined constant values.

4. The computer-implemented method of claim 1, comprising: in response to the determination that the sub-ranking priority value of the first backup request is greater than the predetermined threshold priority value, terminating a running backup request, wherein the running backup request has a lower sub-ranking priority value than the sub-ranking priority value of the first backup request.

5. The computer-implemented method of claim 1, comprising: in response to the determination that the sub-ranking priority value of the first backup request is greater than the predetermined threshold priority value, canceling a housekeeping operation within the data storage library for freeing a drive; assigning the first backup request to the freed drive; and scheduling the cancelled housekeeping operation for when the backup queue has been emptied, wherein the housekeeping operation includes a garbage collection operation.

6. The computer-implemented method of claim 1, wherein the unique service-metadata associated with the at least some backup requests is assigned by a backup client sending the backup requests prior to receiving the plurality of backup requests at the data storage system.

7. A computer program product for determining resource allocation in a backup environment, the computer program product comprising a computer readable storage medium having program instructions embodied therewith, the program instructions readable and/or executable by a computer to cause the computer to:
receive, by the computer, a plurality of backup requests at a data storage system having a data storage library, at least some of the backup requests having unique service-metadata associated therewith,
wherein the data storage library is divided into at least two logical libraries, the backup requests being serviced by one of the logical libraries,
wherein the logical libraries are located across more than one physical library frame;
place, by the computer, each backup request in a backup queue, wherein an ordering of the backup requests within the backup queue is based at least in part on the unique service-metadata associated with the at least some backup requests,
wherein placing each backup request in the backup queue includes determining, by the computer, a group to which the backup request belongs, a group ranking of the group, and a sub-ranking for each of the backup requests within each group,
wherein each group ranking is determined from service level data of the unique service-metadata associated with the at least some backup requests,
wherein each sub-ranking is determined based on a sub-ranking priority value calculated using the unique service-metadata;
perform, by the computer, backup operations on the data storage system according to the ordering of the backup requests within the backup queue; and
in response to a determination that a sub-ranking priority value of a first backup request is greater than a predetermined threshold priority value, recruiting, by the computer, an unused drive from another of the logical libraries to assist in performing a backup operation corresponding to the first backup request.

8. The computer program product of claim 7, wherein the unique service-metadata associated with the at least some backup requests includes information that is selected from the group consisting of: measured actual wait time, max wait time, measured run time, and total backup volume.

9. The computer program product of claim 7, wherein the sub-ranking priority value is determined, by the computer, using the following equation:

$$\text{sub-ranking priority value} = A1(1-(\text{actual wait time}/\text{max wait time})) + A2((1-\text{mount time})/\text{backup run time})), \quad \text{Equation (1)}$$

where "A1" and "A2" are any predefined constant values.

10. The computer program product of claim 7, the program instructions readable and/or executable by the computer to cause the computer to: in response to the determination that the sub-ranking priority value of the first backup request is greater than the predetermined threshold priority value, terminating, by the computer, a running backup request, wherein the running backup request has a lower sub-ranking priority value than the sub-ranking priority value of the first backup request.

11. The computer program product of claim 10, wherein the running backup request has a largest remaining backup time of running backup requests.

12. The computer program product of claim 7, the program instructions readable and/or executable by the computer to cause the computer to: in response to the determination that the sub-ranking priority value of the first backup request is greater than the predetermined threshold priority value, canceling, by the computer, a housekeeping operation within the data storage library for freeing a drive, and assigning the first backup request to the drive.

13. The computer program product of claim 7, wherein the unique service-metadata associated with the at least some backup requests is assigned by a backup client sending the backup requests.

14. A system, comprising:
a processor; and
logic integrated with the processor, executable by the processor, or integrated with and executable by the processor, the logic being configured to:
receive a plurality of backup requests at a data storage system having a data storage library, at least some of the backup requests having unique service-metadata associated therewith,
wherein the data storage library is divided into at least two logical libraries, the backup requests being serviced by one of the logical libraries;
place each backup request in a backup queue, wherein an ordering of the backup requests within the backup queue is based at least in part on the unique service-metadata associated with the at least some backup requests,
wherein placing each backup request in the backup queue includes determining a group to which the backup request belongs, a group ranking of the group, and a sub-ranking for each of the backup requests within each group,
wherein each group ranking is determined from service level data of the unique service-metadata,
wherein each sub-ranking is determined based on a sub-ranking priority value calculated using the unique service-metadata associated with the at least some backup requests;
perform backup operations on the data storage system according to the ordering of the backup requests within the backup queue; and
in response to a determination that a sub-ranking priority value of a first backup request is greater than a predetermined threshold priority value, recruit an unused drive from another of the logical libraries to assist in performing a backup operation corresponding to the first backup request.

15. The system of claim 14, wherein the recruiting includes instructing reorganization of resources of the at least two logical libraries.

16. The system of claim 14, wherein the sub-ranking priority value is determined using the following equation:

$$\text{sub-ranking priority value} = A1(1-(\text{actual wait time}/\text{max wait time})) + A2((1-\text{mount time})/\text{backup run time})), \quad \text{Equation (1)}$$

where "A1" and "A2" are any predefined constant values.

17. The system of claim 14, wherein the at least some of the backup operations are performed concurrently by two different drives in the data storage system during the performing of backup operations on the data storage system.

18. The computer program product of claim 7, wherein at least some of the backup operations are performed concurrently by two different drives in the data storage system.

19. The computer-implemented method of claim 1, wherein at least some of the backup operations are performed concurrently by two different drives in the data storage system.

* * * * *